United States Patent
Chan et al.

(10) Patent No.: US 12,255,768 B2
(45) Date of Patent: Mar. 18, 2025

(54) NETWORK GRAPH MODEL AND ROOT CAUSE ANALYSIS FOR A NETWORK MANAGEMENT SYSTEM

(71) Applicant: Juniper Networks, Inc., Sunnyvale, CA (US)

(72) Inventors: Chi Fung Michael Chan, Mountain View, CA (US); Aleksandar Luka Ratkovic, Palo Alto, CA (US); Raunak Banthia, Milpitas, CA (US); Atul Bhaskarrao Patil, San Ramon, CA (US); Diheng Qu, Palo Alto, CA (US); Rajeev Menon Kadekuzhi, San Jose, CA (US); Roman Bogorodskiy, Saratov (RU); Aleksandr Gordeev, Saratov (RU); Aleksei Goditskii, Novosibirsk (RU)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/996,705

(22) PCT Filed: Mar. 31, 2022

(86) PCT No.: PCT/RU2022/000100
§ 371 (c)(1),
(2) Date: Oct. 20, 2022

(87) PCT Pub. No.: WO2023/191653
PCT Pub. Date: Oct. 5, 2023

(65) Prior Publication Data
US 2024/0223435 A1    Jul. 4, 2024

(51) Int. Cl.
*H04L 41/0631* (2022.01)
*H04L 41/0677* (2022.01)
*H04L 41/12* (2022.01)

(52) U.S. Cl.
CPC ...... *H04L 41/0631* (2013.01); *H04L 41/0677* (2013.01); *H04L 41/12* (2013.01)

(58) Field of Classification Search
CPC . H04L 41/0631; H04L 41/0677; H04L 41/12; H04L 41/122; H04L 41/34; H04L 41/342; H04L 41/344; H04L 41/40
See application file for complete search history.

(56) References Cited

U.S. PATENT DOCUMENTS 10,200,248 B1    2/2019    Jiang et al.
10,516,761 B1    12/2019   A et al.
(Continued)

FOREIGN PATENT DOCUMENTS

| EP | 2666088 B1 | 10/2019 |
| EP | 3602966 B1 | 8/2021 |
| WO | 2012138983 A1 | 10/2012 |

OTHER PUBLICATIONS

Enns, "NETCONF Configuration Protocol," Network Working Group, RFC 4741, Dec. 2006, 95 pp.
(Continued)

*Primary Examiner* — Rachel J Hackenberg
(74) *Attorney, Agent, or Firm* — Shumaker & Sieffert, P.A.

(57) ABSTRACT

A method for managing a plurality of network devices of a network includes determining, by one or more processors, a causality map for the plurality of network devices according to an intent. The method further includes receiving, by the one or more processors, an indication of a network service impact and determining, by the one or more processors, a relevant portion of the causality map based on the network service impact. The method further includes determining, by the one or more processors, one or more candidate root cause faults based on the relevant portion of the causality (Continued)

map and outputting, by the one or more processors, an indication of the one or more candidate root cause faults.

20 Claims, 7 Drawing Sheets

(56) References Cited

U.S. PATENT DOCUMENTS

| | | | | |
|---|---|---|---|---|
| 11,625,293 | B1* | 4/2023 | Ratkovic | G06F 11/079 |
| | | | | 714/37 |
| 11,805,024 | B1* | 10/2023 | Rachamadugu | H04L 41/0803 |
| 2017/0230229 | A1* | 8/2017 | Sasturkar | H04L 41/0631 |
| 2019/0165988 | A1* | 5/2019 | Wang | H04L 41/064 |
| 2019/0227860 | A1* | 7/2019 | Gefen | G06F 16/9024 |
| 2019/0229937 | A1* | 7/2019 | Nagarajan | H04L 12/18 |
| 2023/0016199 | A1* | 1/2023 | Jividen | H04L 41/12 |

OTHER PUBLICATIONS

Harrington et al., "An Architecture for Describing Simple Network Management Protocol (SNMP) Management Frameworks," Network Working Group, RFC 3411, Dec. 2002, 58 pp.
International Search Report and Written Opinion of International Application No. PCT/RU2022/000100 dated Dec. 15, 2022, 9 pp.
International Preliminary Report on Patentability from International Application No. PCT/RU2022/000100 dated Oct. 10, 2024, 9 pp.

\* cited by examiner

NETWORK GRAPH MODEL AND ROOT CAUSE ANALYSIS FOR A NETWORK MANAGEMENT SYSTEM

This application is a national stage entry of International Patent Application No. PCT/RU2022/000100, filed 31 Mar. 2022, the entire contents of which is incorporated herein by reference.

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Ethernet Virtual Private Network (EVPN), Layer Three Virtual Private Network (L3VPN), Virtual Private Local Area Network Service (VPLS), and Peer to Peer (P2P) services. Other services include network configuration services, such as Dot1q VLAN Service, Border Gateway Protocol (BGP), VXLAN, Spanning Tree Protocol, Access Control Lists, or route maps implementing routing policies. Network management systems (NMSs) and NMS devices, also referred to as controllers or controller devices, may support these services such that an administrator (e.g., a network administrator) can easily create and manage these high-level network configuration services.

SUMMARY

In general, this disclosure describes techniques for managing network devices. A network management system (NMS) device, also referred herein as a controller or controller device, may be configured to translate high-level configuration (intents received from an administrator for a plurality of managed network devices) to low-level configuration (to be applied to the managed network devices themselves). In some instances, the controller device may receive an indication of a topology and a role for a resource device and generate device-level configuration information for the resource device.

For example, an administrator (e.g., a human being) may select a topology (e.g., 3-stage Clos or 5-stage Clos) and role for the resource device and provide an intent. As used herein, a 3-stage Clos may refer to a folded Clos with spines and leafs, which may correspond to "spine-leaf networks." A 5-stage Clos adds a superspine layer on top of spines, which may help to provide larger scale by scaling out the number of racks of servers that can be attached to the (larger number of) leaf switches. In some examples, the controller device may generate device-level configuration for the resource device based on the role of the resource device, the topology, and the intent. In some instances, the intent provided by the administrator to the controller device may be associate with many (e.g., more than 10, more than 20, etc.) roles.

As the number of devices increases, so too does a number of alerts that an administrator processes to help to ensure proper operation of the network. Moreover, in response to a single network fault, a system may produce a large number of alerts for hardware and software components of the network. As such, there has been a long-standing need for a solution to reduce a number of alerts that the administrator receives for hardware and software components in response to a network fault. For example, in response to a network fault, which may not be observable, there may be many observable symptoms (e.g., 1000's) from device telemetry.

In some systems, an administrator may review the numerous observable symptoms to manually identify a root cause fault. Administrators may deploy filters to reduce an amount of alerts to review. However, even when deploying filters, a moderately sized network may have too many alerts for an administrator to review in the event of a network fault, which may add delay in mitigating the network fault and restoring network services provided by a network being managed by the administrator.

In accordance with the techniques of the disclosure, a network controller may be configured to identify root cause faults (RCFs) from impacts based on observable symptoms (e.g., device telemetry) and an intent provided by the administrator. As used herein, a root cause fault may refer to one or more issues that cause symptoms and impacts. Symptoms are observable (e.g., using device telemetry) and may be used to match root cause faults. Impacts may refer to causal consequences of root cause faults but may not be observable. For example, a root cause fault may be a link being down (e.g., a cable is broken). In this example, symptoms may include telemetry data indicating poor network connectivity and the impact may be poor or slow network service at devices using the down link.

In one example, a method for managing a plurality of network devices of a network includes determining, by one or more processors, a causality map for the plurality of network devices according to an intent. The causality map includes a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices. The method further includes receiving, by the one or more processors, an indication of a network service impact and determining, by the one or more processors, a relevant portion of the causality map based on the network service impact. The method further includes determining, by the one or more processors, one or more candidate root cause faults based on the relevant portion of the causality map and outputting, by the one or more processors, an indication of the one or more candidate root cause faults.

In another example, a controller device includes a memory and one or more processors coupled to the memory. The memory stores instructions that, when executed, cause the one or more processors to determine, a causality map for the plurality of network devices according to an intent. The causality map includes a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices. The instructions further cause the one or more processors to receive an indication of a network service impact and determine a relevant portion of the causality map based on the network service impact. The instructions further cause the one or more processors to determine one or more candidate root cause faults based on the relevant portion of the causality map and output an indication of the one or more candidate root cause faults.

In one example, a computer-readable storage medium has stored thereon instructions that, when executed, cause a processor of a controller device that manages a plurality of network devices to determine, a causality map for the plurality of network devices according to an intent. The causality map includes a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices. The instructions further cause the processor to receive an indication of a network service impact and determine a relevant portion of the causality map based on the network service impact. The instructions further cause the processor to determine one or more candidate root cause faults based on the relevant portion of the causality map and output an indication of the one or more candidate root cause faults.

The details of one or more examples are set forth in the accompanying drawings and the description below. Other features, objects, and advantages will be apparent from the description and drawings, and from the claims.

DETAILED DESCRIPTION

Figure 1:
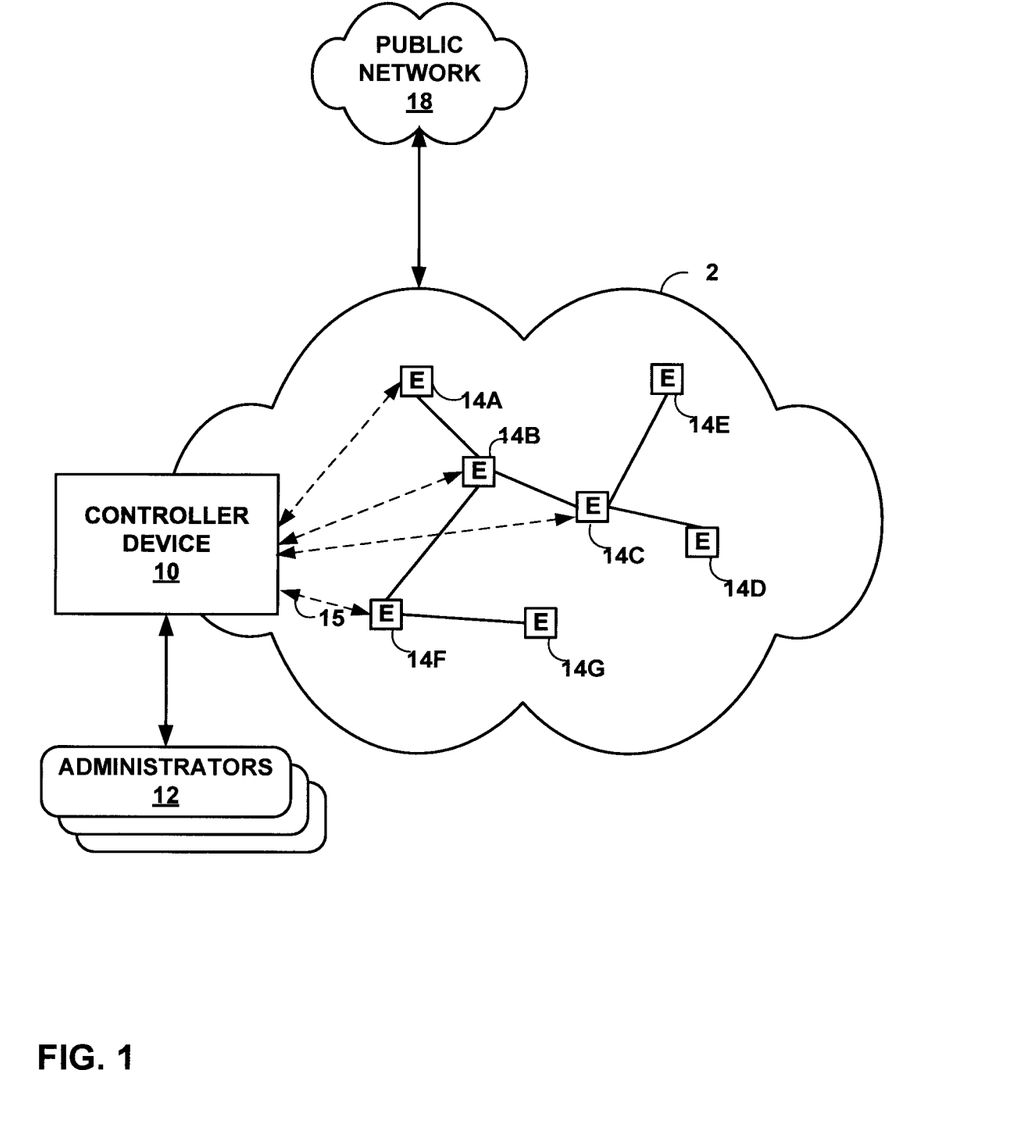
FIG. 1 is a block diagram illustrating an example including elements of an enterprise network that are managed using a controller device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any discrete data unit defined by any protocol, such as, for example, Ethernet, a cell defined by the Asynchronous Transfer Mode (ATM) protocol, Transmission Control Protocol (TCP), or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12 uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to herein as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. Examples of interfaces using text-based commands may include one or more of NX-API™, Arista EOS™, Juniper Telemetry Interface™, and gNMI telemetry collection interface. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts that can be submitted by controller device 10 to any or all of elements 14. For example, in addition to a CLI interface, elements 14 also provide interfaces for receiving scripts that specify the commands in accordance with a scripting language. In a sense, the scripts may be output by controller device 10 to automatically invoke corresponding remote procedure calls (RPCs) on the managed elements 14. The scripts may conform to, e.g., extensible markup language (XML) or another data description language.

Administrator 12 uses controller device 10 to configure elements 14 to specify certain operational characteristics that further the objectives of administrator 12. For example, administrator 12 may specify for an element 14 a particular operational policy regarding security, device accessibility, traffic engineering, quality of service (QoS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

A user "intent" may represent a single source of truth, from which device configurations are derived. An intent-based networking system may help to allow administrators to describe the intended network/compute/storage state. Intents may be represent a state and may be persisted across system restarts so the user does not lose the source of truth for their network's management and operation. For example, suppose the intent starts with a network topology definition with servers connected to leaf switches, where the servers host user workloads. In this example, traffic between the servers could vary over time and/or hotspots could develop in the network. For instance, a workload could be deployed on 2 different racks of servers that the traffic between the communicating processes to traverse an oversubscribed fabric. But it is possible to detect this with telemetry and then update the workload distribution so that endpoints get moved to the same rack, hence minimizing the use of oversubscribed links in the fabric. In this example, the intent could be modeling the policy of how widely distributed (e.g. how many racks) a workload's endpoint could be spread across, and/or how much fabric links are supposed to be used by this workload. In this way, the policy could be updated based on the current network state.

Intents may be represented as intent data models, which may be modeled using unified graphs. Intent data models may be represented as connected graphs, so that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When intents are modeled using a unified graph model, extending new intent support needs to extend the graph model and compilation logic.

Controller device 10 may be configured to accept high-level configuration data, or intents, from administrator 12 (which may be expressed as structured input parameters, e.g., according to YANG, which is described in Bjorklund, "YANG-A Data Modeling Language for the Network Configuration Protocol (NETCONF)," Internet Engineering Task Force, RFC 6020, October 2010, available at tools.ietf.org/html/rfc6020).

In order to configure devices to perform the intents, a user (such as an administrator 12) may write translation programs that translate high-level configuration instructions (e.g., instructions according to an intent data model, which may be expressed as a unified graph model) to low-level configuration instructions (e.g., instructions according to a device configuration model). As part of configuration service support, administrator 12 may provide the intent data model and a mapping between the intent data model to a device configuration model.

Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent data model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may ease the management of networks and intents are declarative. To realize intents, controller device 10 may attempt to select optimal resources from elements 14 and/or from other devices.

In general, controller device 10 may be configured to translate high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent.

In accordance with the techniques of the disclosure, controller device 10 may be configured to identify root cause faults (RCFs) of hardware components and/or software components of network 2 from impacts based on observable symptoms (e.g., device telemetry) and an intent provided by the administrator. A root cause fault may refer to one or more issues that cause symptoms and impacts. Symptoms may be observable (e.g., using device telemetry) and may be used to match root cause faults. Impacts may refer to causal consequences of root cause faults but may not be observable. For example, a root cause fault may be a link being down (e.g., a cable is broken). In this example, symptoms may include telemetry data indicating, for example, interfaces on both ends of a link being operationally down and/or no neighbor reported for both interfaces and the impact may include poor or slow network service at devices using the down link.

For example, controller device 10 may determine a causality map for network 2 based on an intent. The causality map may include a first plurality of nodes that each represent a respective root cause fault (e.g., cable is broken), a second plurality of nodes that each represent a respective symptom (e.g., dropped packets detected using device telemetry), and a third plurality of nodes that each represent a respective network service impact (e.g.., poor network connectivity for web services). Controller device 10 may receive an indication of a network service impact. For example, a customer using web services may generate a trouble ticket indicating poor network connectivity to web services.

In this example, controller device 10 may determine a relevant portion of the causality map based on the network service impact and determine one or more candidate root cause faults based on the relevant portion of the causality map. For instance, controller device 10 may determine symptoms of network 2 and match the symptoms and network service impact to a portion of a causality map. Causality relationships of the causality map may be generated using, for example, a machine learning algorithm. Controller device 10 may output an indication of the one or more candidate root cause faults. For example, controller device 10 may output an indication of the one or more candidate root cause faults that are included in the portion of the causality map. In this way, administrator 12 may be directed to a small set of potential root cause faults (e.g., less than 10, less than 5, less than 3, or only 1), which may enable faster identification of the actual root cause fault for administrator 12 and thereby reduce an amount of time that a customer is impacted by a network fault.

Figure 2:
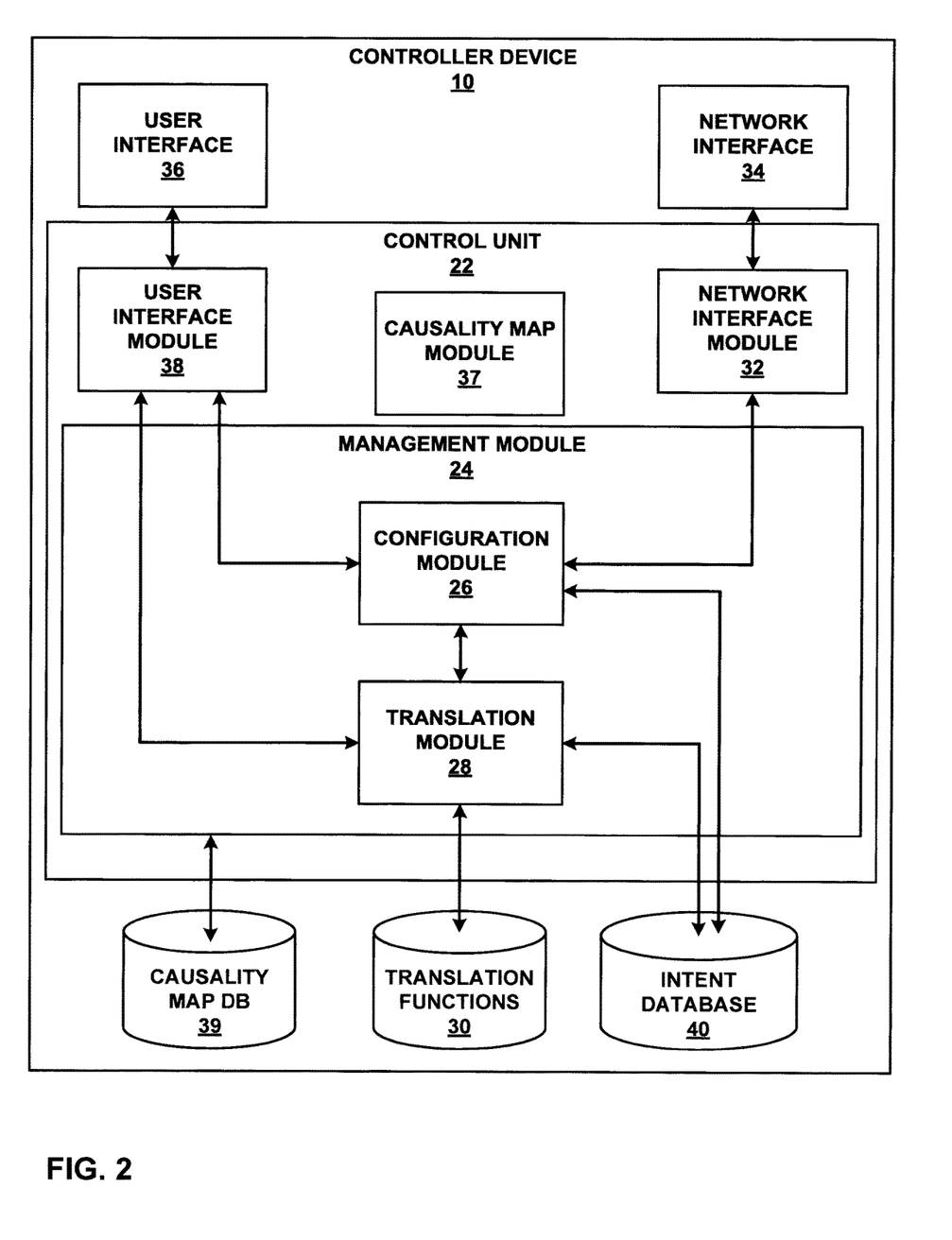
FIG. 2 is a block diagram illustrating an example set of components for the controller device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive an intent (e.g., a high-level configuration instruction) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes intent database 40. Intent database 40 may include a data structure describing managed network devices, e.g., network elements 14. Intent database 40 may act as an intent data store, which may be used to persist and manage collections of intent data models. For example, intent database 40 may include information indicating device identifiers (such as MAC and/or IP addresses), device type, device vendor, devices species (e.g., router, switch, bridge, hub, etc.), or the like. Intent database 40 may store current configuration information (e.g., intent data model, or in some cases, both intent data model and low-level configuration information) for the managed devices (e.g., network elements 14). Intent database 40 may include a database that comprises a unified intent data model.

Management module 24 may maintain a data structure in intent database 40. The data structure may include a plurality of vertices and a plurality of edges, each vertex of the plurality of vertices representing a respective network device of a plurality of network devices (e.g., network elements 14) or a respective stateless intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Translation module 28, which may also be referred to herein as a "device manager," may determine which devices are managed using intent database 40. Translation module 28 determines which of translation functions 30 to execute on the high-level configuration instructions based on the information of intent database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions from translation module 28, configuration module 26 sends the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example as allowing administrator 12 (FIG. 1) to interact with controller device 10, other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

Management module 24 may determine a causality map according to intent and store the causality map at causality map database (DB) 39. Management module 24 may generate the causality map to include a first plurality of nodes that each represent a respective root cause fault, a second plurality of nodes that each represent a respective symptom, and a third plurality of nodes that each represent a respective network service impact.

Cabling information for elements 14 may be considered part of the intent. In one example, administrator 12 may output a request to management module 24 to automatically assign interface names to interface nodes in the intent graph based on the model of the device. An algorithm may help to ensure that interface names are assigned such that interfaces with the proper speeds are used for each link. In some examples, the cabling information may be discovered automatically from device telemetry—for instance using the Link Layer Discovery Protocol (LLDP)—from an existing already-cabled network. This discovered cabling may be used to update the intent graph, which may override the output of the above algorithm.

As noted above, the intent stored by intent database 40 may represent a graph that models systems, interfaces, links, and/or workloads. Systems may be connected to one another via links. Each link has 2 interfaces, where each interface is hosted on each of the 2 systems the link is connecting. Systems may also host workloads. "has", "hosted" are relationships (e.g. graph edges) between those entities (e.g. graph nodes).

Management module 24 may execute a translation function that reads the intent graph stored in intent database 40. For example, the translation function may cause processing circuitry to run one or more queries on the graph to derive the causality map. For instance, the translation function may cause the processing circuitry to run the query "system1→interface1-≥link←interface2←system2" to get all subgraphs in the graph that match that pattern of nodes and relationships. Each match may represent a link between 2 systems, and their interfaces. For each link in this example, the RCF "link/broken" has symptoms "interface1/operationallyDown", "Interface1/neighborMissing", "interface2/operationallyDown", "interface2/neighborMissing".

In this example, the intent may specify that 2 servers X and Y are connected to different leafs (e.g., leaf1 and leaf2), which are in turn connected to spine1 and spine2 in a full mesh. Moreover, in this example, there is a single link L that connects leaf1 and spine1. The translation function, when executed by processing circuitry, may run queries to derive the fact that servers X and Y uses link L (among other spine-leaf links) to communicate with one another (over multiple hops). But link L's breakage will reduce the amount of available bandwidth because there will be 1 less path between servers X and Y. Therefore, the RCF "L/broken" causes the impact "X-Y-traffic/reducedBandwidth".

In this example, there is a workload W hosted on servers X and Y. This could be modeled in the intent with the graph structure "W-hosted_on→X", and "W-hosted_on→Y". The translation function, via graph queries, finds these "hosted_on" relationships, and extends the causality chain so that impact "X-Y-traffic/reducedBandwidth" further propagates to the impact "W/performanceImpaired".

Thus, the causality map for this example looks like this:
RCF: L/broken
RCF Propagates to (i.e. arrows going towards) symptoms (interfaces operationally down and neighbors missing)
RCF Propagates to impact "X-Y-traffic/reducedBandwidth", which further propagates to "W/performanceImpaired"

Management module 24 may determine a causality map further based on a topology for elements 14. For example, the topology for elements 14 may include one or more of a 3-stage Clos network topology, a 5-stage Clos network topology, or a spine and leaf topology. In this example, management module 24 may determine a causality map based on the topology, a role (e.g., leaf or spine) assigned to each element of elements 14, and the intent. For example, management module 24 may generate the causality map based on an intent indicating to configure element 14A with a role as a first spine, element 14B as a second spine, and elements 14C-14D as leafs (see FIG. 3).

Causality map module 37 may be configured to generate a causality map based on an intent stored in intent database 40. For example, causality map module 37 may include a translation function that, when executed by processing circuitry, creates the causality map from intent. Causality map module 37 may output the causality map and telemetry data to a program (e.g., a program external to causality map module 37 or a program within causality map module 37) and the program may, when executed by processing circuitry, output a set of matched RCFs and the impacts the set of matched RCFs cause.

In some examples, causality map module 37 may include a machine learning module configured to apply a machine learning algorithm to determine a relevant portion of the causality map. For example, causality map module 37 may apply the machine learning module to a causality map stored by causality map database 39 to determine one or more causality relationships. As discussed further below, the machine learning module may be trained using the causality map and using symptoms and impacts for different of root cause faults. Management module 24 may apply pattern matching to the portion of the causality map. In this way, administrator 12 may be directed to a small set of potential root cause faults (e.g., 2), which may enable faster identification of the actual root cause fault and thereby reduce an amount of time that a customer is impacted by a network fault.

Figure 3:
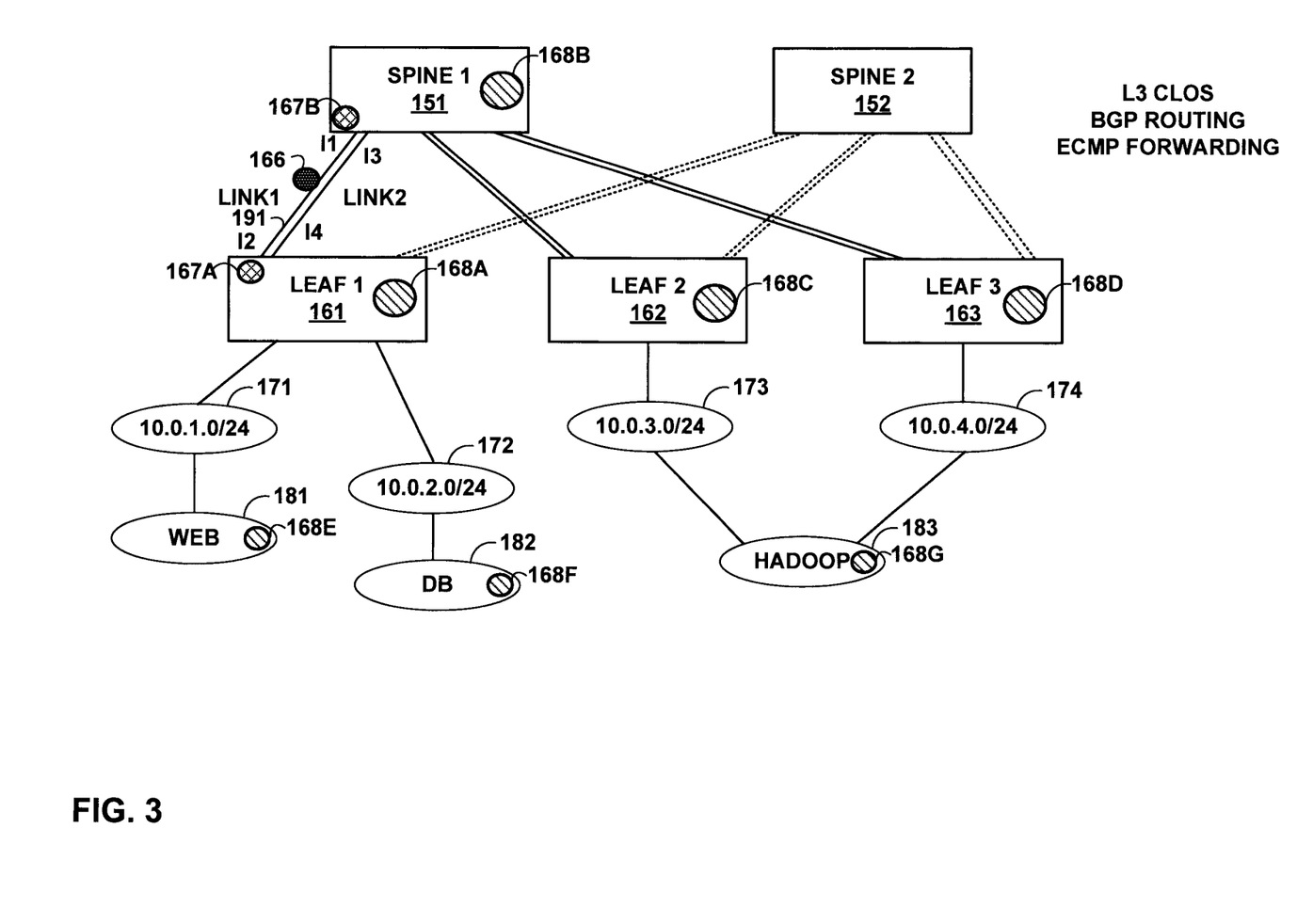
FIG. 3 is a conceptual diagram illustrating example root cause fault in accordance with the techniques of this disclosure.

FIG. 3 is a conceptual diagram illustrating example root cause fault in accordance with the techniques of this disclosure. FIG. 3 is discussed with FIGS. 1-2 for example purposes only. Spines 151, 152 and leafs 161-163 may be examples of network elements 14 of FIG. 1.

FIG. 3 illustrates a root cause fault 166 of link 191 being down may cause symptoms 167A, 167B to be observable by spine 151 and leaf 161 (e.g., interfaces being down). Impacts 168A-168G (collectively, impacts 168) may include poor network services at virtual networks. For instance, impact 168E may include poor network services at a first virtual network label 181 ("Web services") for a first range of network addresses 171 (e.g., 10.0.1.0/24). Impact 168F may include poor network services a second virtual network label 182 for "database processes (DB)" for a second range of network addresses 172 (e.g., 10.0.2.0/24). In this instance, impact 168G may include poor network services a third virtual network label 183 for "Hadoop compute clusters" for a third range of network addresses 173 (e.g., 10.0.3.0/24) and a fourth range of network addresses 174 (e.g., 10.0.4.0/24). Additionally, impacts 168 may include poor network services from telemetry data generated by leafs 161-163 and spine 151.

Figure 4:
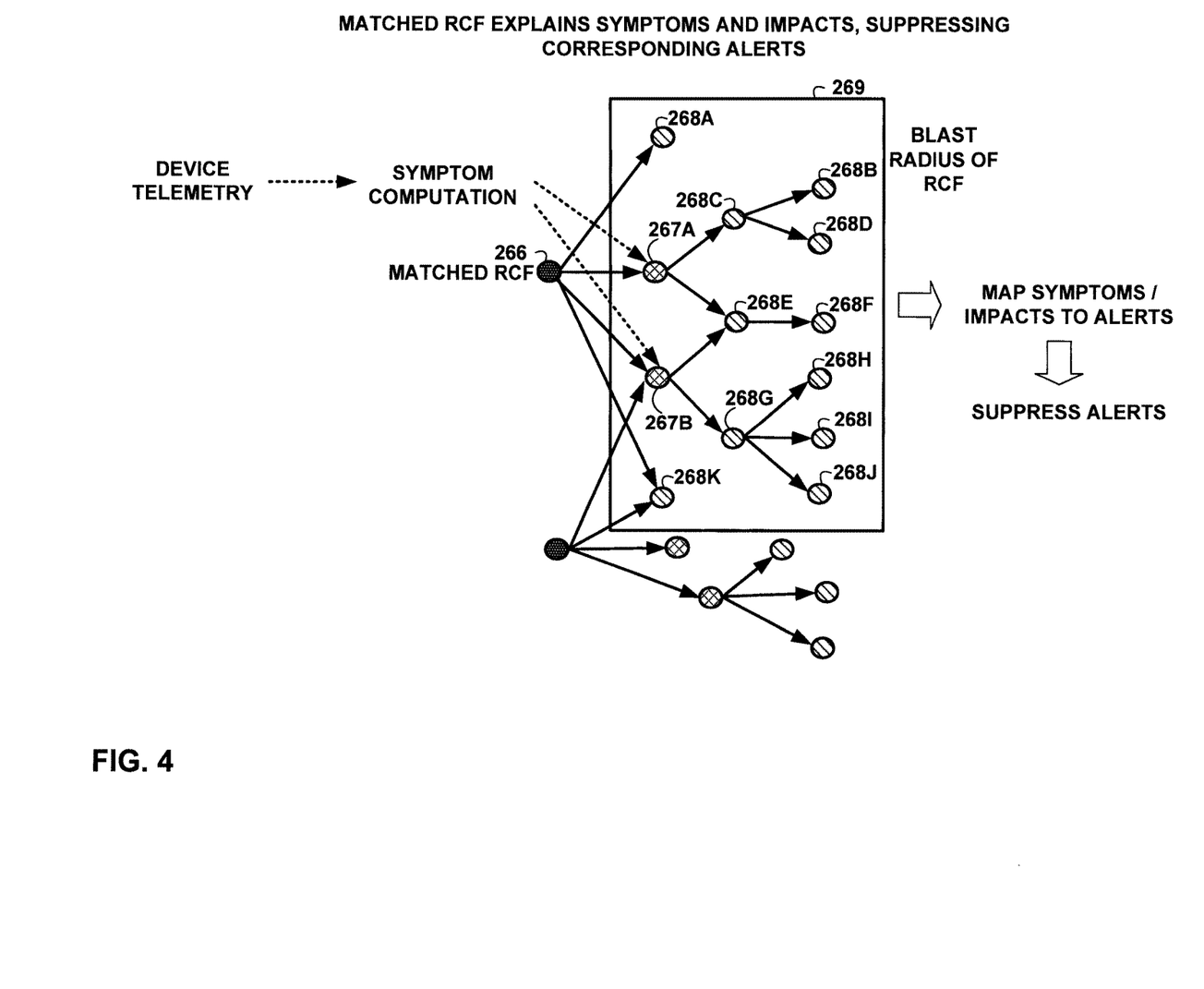
FIG. 4 is a conceptual diagram illustrating example of alert suppression in accordance with the techniques of this disclosure.

FIG. 4 is a conceptual diagram illustrating example of alert suppression in accordance with the techniques of this disclosure. FIG. 4 is discussed with FIGS. 1-3 for example purposes only. In the example of FIG. 4, in response to matching a root cause fault (RCF) 266 (e.g., "MATCHED RCF") to detected symptoms 267A, 267B, controller device 10 may suppress alerts in a blast radius 269 of the root cause fault 266. For example, controller device 10 may suppress a set of alerts using one or more candidate root cause faults. However, this approach may be limited by a number of RCFs that may be matched to symptoms and impacts. For example, there may be only a few RCFs that are matched for a system, which results in a limited number of alerts being suppressed. Moreover, the alert suppression techniques do not help to identify a RCF (e.g., RCF 266) from an impact (e.g., one or more of impacts 268A-268J).

Figure 5A:
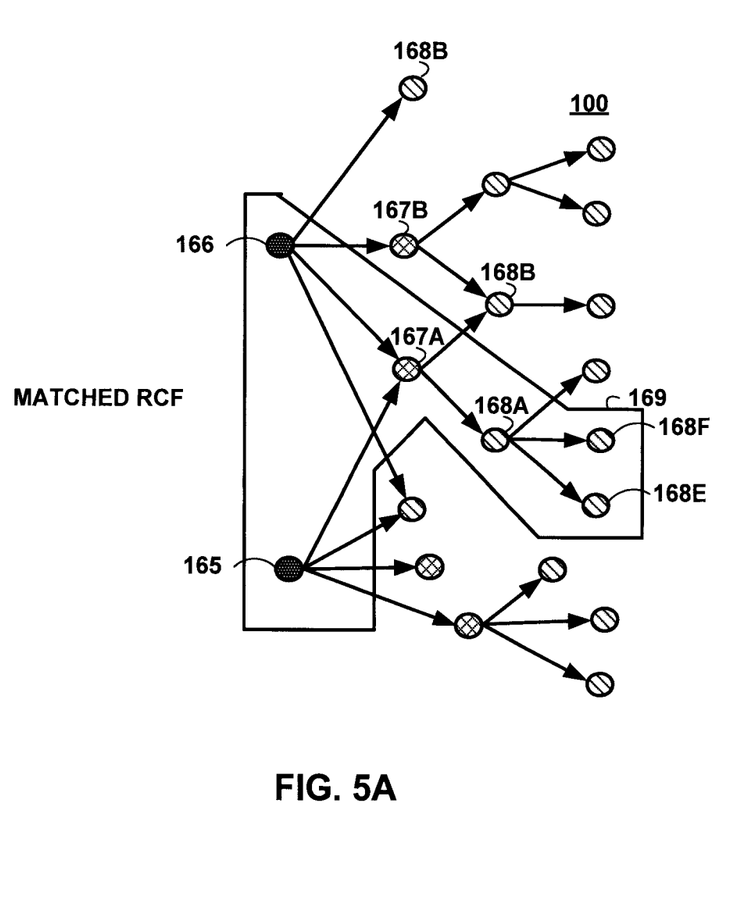
FIG. 5A is a conceptual diagram illustrating example causality map in accordance with the techniques of this disclosure.

FIG. 5A is a conceptual diagram illustrating example of causality map 100 in accordance with the techniques of this disclosure. Causality map 100 may include a first plurality of nodes that each represent a respective root cause fault, such as, for example, root cause faults 166, 165. Causality map 100 may further include a second plurality of nodes that each represent a respective symptom, such as, for example, symptoms 167A-167C. Causality map 100 may include and a third plurality of nodes that each represent a respective network service impact, such as, for example, impacts 168B, 168E, and 168F.

Each networking device (e.g., elements 10 of FIG. 1, spines 151, 152, or leafs 161-163 of FIG. 3 may include a serial number that is mapped to a label, that is mapped to a unique model identifier for the causality map 100. For example, controller device 10 may receive an intent to configure element 14A with a role as a spine and a label "Spine1." In this example, controller device 10 may determine a mapping of the serial number for element 14A to the label and from the label to the unique model identifier for causality map 100. Controller device 10 may determine causality map 100 according to the intent and based further on the mapping. In the example of FIG. 5A, the serial number for element 14A is mapped (e.g., using intent) to the label "Spine1," which is mapped to a unique model identifier for the node representing impact 168B. In this way, controller device 10 may determine, using the intent received from the administrator 12 to configure the particular network device as spine 151, causality map 100 that maps symptom 167A (e.g., interfaces being down) to impacts 168A, 168E, 168F (e.g., poor network connectivity).

Instead of alert suppression (see FIG. 4), controller device 10 may perform an impact analysis, which may help to more quickly resolve network impacts. For example, controller device 10 may generate causality map 100 based on an intent graph. Controller device 10 may generate the intent graph based on an intent provided by administrator 12. In this example, controller device 10 may use the causality graph to match an impact (e.g., received from a customer using network 2) with a set of symptoms to identify a set of root cause faults. FIG. 5A is discussed further with respect to FIG. 5B.

Figure 5B:
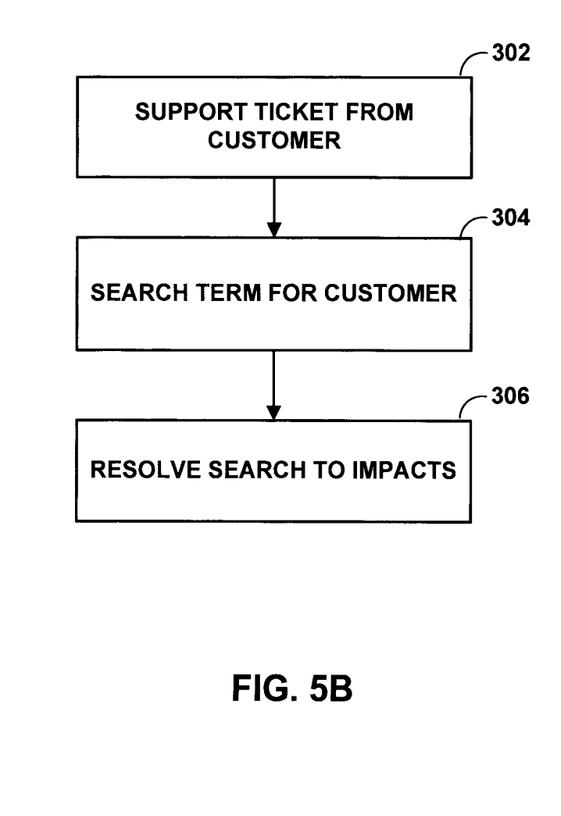
FIG. 5B is a flowchart illustrating an example process for impact analysis according to techniques of this disclosure.

FIG. 5B is a flowchart illustrating an example process for impact analysis according to techniques of this disclosure. FIGS. 5A, 5B are discussed with respect to FIGS. 1-4 for example purposes only. Controller device 10 receives a support ticket from a customer (302). For example, the support ticket may be from a customer using a web services that reports impact 168E indicating a poor network experience. In some examples, however, the support ticket may report different combinations of impacts, for example, impacts for database services and/or for distributed processing services (e.g., Hadoop services).

In response to the support ticket from the customer, controller device 10 may search a term for a customer (304). For example, in response to a support ticket for a customer using web services, controller device 10 may search for first virtual network label 181 ("Web services"), which is associated with a first range of network addresses 171 (e.g., 10.0.1.0/24). In this example, controller device 10 may resolve the search to impacts (306). For example, controller device 10 may match impact 168E to symptom 167A and potential root cause faults 165, 166 as shown in FIG. 5A.

Controller device 10 may determine a match, for example, by applying a machine learning algorithm. For example, controller device 10 may apply pattern matching to a model of the causality relationships for causality map 100. As shown in FIG. 5A, each node of a third plurality of nodes (e.g., impacts 168E, 168F) may comprises one or more first edges (e.g., lines) to one or more nodes in a second plurality of nodes (e.g., symptom 167A), and each node of the second plurality of nodes comprises one or more second edges to one or more nodes of the first plurality of nodes. In this example, controller device 10 may match the network service impact to one of the nodes in the third set of nodes and identify at least one node in the first set of nodes using the one or more first edges and the one or more second edges. For instance, controller device 10 may match the network service impact indicated in the support ticket to impact 168E and identify root cause faults 165, 166 using the one or more first edges and the one or more second edges.

Controller device 10 may determine that the one or more candidate root cause faults are within the relevant portion of the causality map indicated by a model of causality relationships 169. For example, controller device 10 may determine that impact 168E is associated with causality relationships 169 in response to determining that symptom 167A satisfies (e.g., matches) matching criteria for model of the causality relationships 169. While FIG. 5A illustrates only 2 root cause faults, causality map 100 may include more than 2 (e.g., more than 10 potential root cause faults, more than 100 potential root cause faults, or more than 1,000 potential root cause faults). As such, controller device 10 may reduce a number of potential root cause faults to the number of root cause faults in the model of the causality relationships 169 compared to all the potential root cause faults of causality map 100. Controller device 10, another device, or a cloud-based system, may apply machine learning to determine the model of the model of causality relationships 169 that map symptom 167A to impacts 168E, 168F and root cause faults 165, 166. In this way, administrator 12 may be directed to a small set of potential root cause faults (e.g., 2), which may enable faster identification of the actual root cause fault and thereby reduce an amount of time that a customer is impacted by a network fault.

Figure 6:
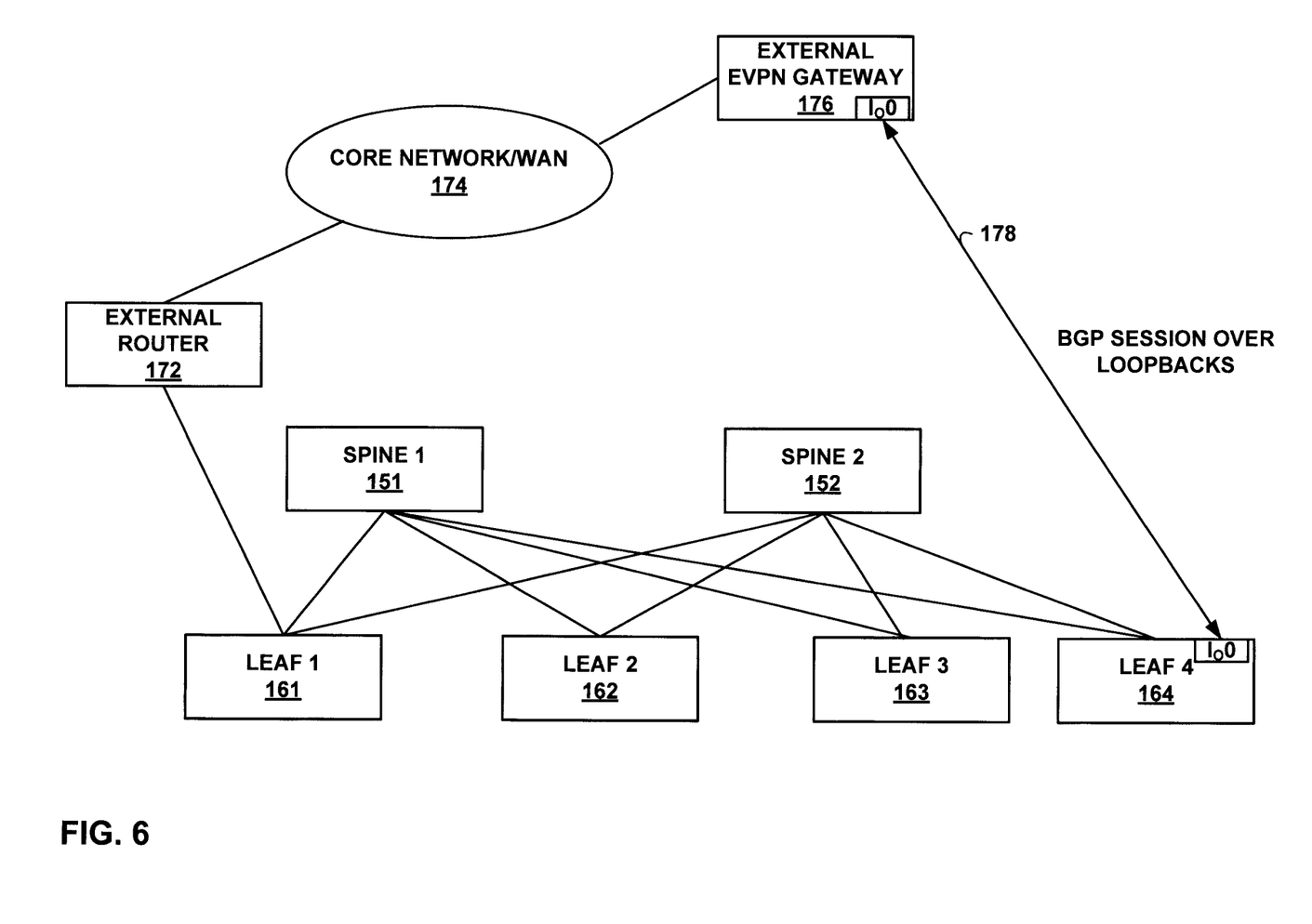
FIG. 6 is a conceptual diagram illustrating an example root cause identification (RCI) model for diagnosing root cause failures of BGP sessions for extending external Ethernet virtual private network (EVPN) to multiple domains according to techniques of this disclosure.

FIG. 6 is a conceptual diagram illustrating an example root cause identification (RCI) model for diagnosing failures of BGP sessions for extending EVPN to multiple domains according to techniques of this disclosure. FIG. 6 describes non-limiting examples of symptoms, impacts, and root cause faults.

In the example of FIG. 6, leaf 164 ("Leaf 4") is a local EVPN speaker in a managed blueprint. Leaf 164 may established a Border Gateway Protocol (BGP) session with the external Ethernet virtual private network (EVPN) gateway over loopbacks in the default virtual routing and forwarding (VRF). In order for the transmission control protocol (TCP) connection to be established, there may necessarily be reachability in the underlay between leaf 164 and external EVPN gateway 176. This reachability may be provided via the border leaf 161 ("Leaf 1"), external router 172, and possibly a core network/WAN 174 that is beyond a control of controller device 10.

At any time, the network operator would like to be alerted to any issues that would impact traffic between endpoints of L2 domains stretched across multiple domains. One common cause that results in wide-spread impact on all stretched L2 domains is the breakage of the EVPN control plane. In this model, we define the root cause faults that could cause these BGP sessions to become operationally down.

Controller device 10 may be configured to identify a root cause fault for a BGP session of external router 172 being misconfigured. For example, leaf 164, which may represent a local EVPN speaker, may be unable to resolve a loopback 178 for external EVPN Gateway 176, which is the target IP of the TCP connection for that BGP session. Therefore, the session fails to be established. A BGP implementation may disallow a resolution of next hops to BGP peer using the default route. Juniper Apstra™ configurations may also implement this constraint.

For the root cause fault of external router 172 being misconfigured, leaf 161, which may represent the border leaf, may exchange routes with external router 172 in the default VRF, and leaf 161 may accept non-default routes from external router 172 that cover loopback 178 for external EVPN gateway 167. However, leaf 161 may not learn of such non-default routes. Therefore, none of the systems in the blueprint could learn such non-default routes.

This root cause fault points administrator 12 to a misconfiguration or a runtime routing issue in external router 172 and/or core/WAN network 174. Controller device 10 may be configured to determine symptoms for identifying a root cause fault for the BGP session of external router 172 being misconfigured such as, for example, one or more of BGP session operational status of external router 172 being down or external router 172 missing a non-default route to external EVPN gateway 167. For example, controller device 10 may determine a missing a non-default route to loopback 178 at a local EVPN speaker (e.g., leaf 161), missing a non-default route to loopback 178 at a border leaf(s) importing non-default routes from external router 172, or a border leaf BGP running a configuration that allows learning of non-default route.

The impacts of EVPN flood list routes missing anomalies may occur for every L2 VNI extended beyond the domain of the local EVPN speaker (e.g., leaf 164). Any extended L2 VNI may have some participating virtual tunnel endpoints (VTEPs) in other domains. As such, Type 3 routes for the L2 VNI may be advertised from every such VTEP. If the domain has lost its EVPN control plane connectivity to the domain that hosts those external VTEPs, then these routes may be missing from the EVPN RIB (routing table) of the VTEPs in the local domain. Therefore, anomalies may be raised by the operating system (e.g., AOS™)

Missing routes in EVPN prefix routes may include EVPN IP Prefix Routes missing anomalies. EVPN IP Prefix Routes missing anomalies may occur for every switch virtual interface (SVI) subnet extended beyond the domain of the local EVPN speaker. Any extended L2 VNI may have some VTEPs in other domains acting as anycast gateways for that L2 VNI. Thus, Type 5 routes for the L2 VNI's SVI subnet may be advertised from every such VTEP. If the domain has lost the EVPN control plane connectivity to the domain that hosts those external VTEPs, then routes may be missing from the EVPN RIB of the VTEPs in the local domain. As such, anomalies may be raised by AOS™.

An example of switched traffic being disrupted may include switched traffic between virtual network endpoints within the same (extended) L2 VNI being disrupted. An example of routed traffic being disrupted may include routed traffic between virtual network endpoints within the different (extended) L2 VNI in the same (extended) L3 VNI being disrupted.

Controller device 10 may be configured to identify a root cause fault for a border leaf BGP routing policy may be misconfigured (e.g., the policy rejects a non-default route to loopback 178 that is advertised by external router 172 or with no non-default route to loopback 178). As a result, local EVPN speaker (e.g., leaf 164) may be unable to resolve loopback 178, which is the target Internet protocol (IP) address of the TCP connection for that BGP session. Therefore, the session fails to be established. This is the same effect on the local EVPN speaker (e.g., leaf 164) as the previous root cause fault described above for external router 172 being misconfigured.

In this failure scenario, the border leaf (e.g., leaf 161) may be exchanging routes with external router 172 in default VRF, but the border leaf is not accepting non-default routes from external router 172 that that provides underlay reachability to loopback 178 for the local domain. Therefore, none of the systems in the local domain learn such routes. This root cause fault points to a misconfiguration of specific border leaf(s).

Symptoms identifying a root cause fault for a border leaf BGP routing policy of leaf 161 being misconfigured may include, for example, a border leaf BGP running a configuration that prevents learning of non-default route. Impacts of a border leaf BGP routing policy of leaf 164 being misconfigured may include, for example, a BGP session operational status for leaf 161 being down, missing a non-default route to loopback 178 at local EVPN speaker (e.g., leaf 164), the leaf missing non-default routes, missing routes in an EVPN flood list routes, or missing routes in EVPN prefix routes for the external router. Examples of the leaf missing non-default routes may include, for example, missing a non-default route to loopback 178 at the local EVPN speaker (e.g., leaf 164) and/or missing a non-default route to loopback 178 at border leaf(s) importing non-default routes from router covering loopback 178.

For the root cause fault for a border leaf BGP routing policy being misconfigured, the route filters being incorrect on the border leaf may imply that the non-default route to the loopback 178 may not be learned via the border leaf. However, the lack of non-default route learning via the border leaf does not necessarily imply the route is missing at local EVPN gateway (e.g., leaf 164), because the route could be learned from other border leafs in the blueprint. Nonetheless, it may be beneficial to identify the root cause fault for a border leaf BGP routing policy being misconfigured.

Controller device 10 may be configured to identify a broken outbound path to external EVPN gateway 176 for a BGP session. For the root cause fault for a broken outbound path to external EVPN gateway 176 BGP peer, the local EVPN speaker (e.g., leaf 164) may be attempting to establish a BGP session to external EVPN gateway 176. These attempts may repeatedly fail because packets are getting dropped in the path towards external EVPN gateway 176, e.g. by a firewall or a faulty device.

In the root cause fault of a broken outbound path to external EVPN gateway 176, a local EVPN speaker (e.g., leaf 164) may have all the routing information required to reach the BGP peer. Therefore, the local BGP will automatically start the finite state machine (FSM) for the configured session, and actively initiate a TCP connection to the peer. Per RFC 4271, it is possible for a BGP session to be configured to start by being "passive", e.g. always wait for the peer to initiate the TCP connection. Because packets sent to the peer are being dropped (see RFC 4271 Section 8 for full BGP FSM specification), the FSM may transition between connect, active and idle states.

In the connect state, the FSM initiates a TCP connection. The TCP SYN is sent, but no SYN-ACK is received, because the peer did not get the TCP SYN. The TCP retransmits the SYN, does exponential backoff for the retransmission timeout (RTO). If the FSM ConnectRetryTimer expires, the FSM retries TCP connect (previous connection is closed), and stays in the connect state. If TCP connection timeout (e.g. max syn retries exceeded—occurs before ConnectRetryTimer expiry), then the FSM transitions to the active state.

In the active state, the FSM is waiting for TCP connection from a peer. The FSM may receive SYN, but the SYN-ACK is dropped. As such, the peer never completes the 3-way handshake. When the ConnectRetryTimer expires, the FSM transitions to the connect state. It is possible that the peer sends a FIN or RST when the peer's connection fails to receive the SYN-ACK. In this case, the FSM transitions to Idle.

In the idle state, the FSM is neither waiting for a TCP connection from peer, nor attempting to actively establish a TCP connection to the peer. Depending on the BGP implementation, the FSM may be automatically (re)started, moving the FSM back into the connect state. It is, however, possible that the FSM gets "stuck" in the Idle state, requiring manual intervention to be restarted.

The FSM may not transition into the "OpenSent" or "OpenConfirm" states, because the TCP connection cannot be established, so no BGP OPEN message can be sent or received. As the FSM goes through "OpenConfirm" to get to the "Established" state, the FSM may not transition into "Established." Based on the foregoing, controller device 10 may collect the FSM state and track the FSM state across time and define a symptom as the FSM bouncing around these states.

The above FSM transition behavior could also happen if the inbound path is blocked. In that case, the TCP behavior is slightly different. For example, in the connect state, the TCP SYNs to the peer could be received by the peer, but the SYN-ACK from the peer is dropped. Eventually the FSM transitions to the active state (e.g., after a TCP timeout). In the active state, the TCP SYNs from a peer device may be dropped. Eventually the ConnectRetryTimer expires, and the FSM may transitions to the connect state. When the inbound path is blocked, there may be an absence of TCP sockets in the local system with source port 179 that are stuck in SYN-RECV state. Therefore, to distinguish between outbound path vs inbound path blocks, controller device 10 may collect the TCP socket state corresponding to the BGP session (e.g., based on source/destination IPs). If the TCP sockets created (and destroyed) for the session encompass both the "SYN-SENT" and "SYN-RECV" states, then controller device 10 may have a higher confidence that this is an issue of outbound path being blocked.

Symptoms identifying root cause fault for a broken outbound and/or inbound path to external EVPN gateway 176 BGP peer may include, for example, one or more of a BGP session state for the BGP peer session changing only between a connect state, an active state, and an active state, or a TCP socked state for peer devices of the BGP session corresponding to waiting for an acknowledgement to a connection request. For example, the symptoms may include one or more of a BGP session state bounces between the connect state, the active state, and the idle state, but not other states, the TCP sockets being stuck in state "SYN-SENT"—source IP=local EVPN speaker's loopback IP, destination port=179, destination IP=external gateway's loopback IP (e.g., source port is "don't care"), and the TCP sockets being stuck in state "SYN-RECV"—source port=179, source IP=local EVPN speaker's loopback IP, destination IP=external gateway's loopback IP (e.g., destination port is "don't care).

Impacts of a root cause fault for a broken outbound and/or inbound path to external EVPN gateway 176 may include EVPN flood list routes missing anomalies, EVPN IP Prefix Routes missing anomalies, switched traffic between virtual network endpoints within the same (extended) L2 VNI being disrupted, and/or routed traffic between virtual network endpoints within the different (extended) L2 VNI in the same (extended) L3 VNI being disrupted.

For the root cause fault for a broken inbound path from external EVPN gateway 173, the local EVPN speaker (e.g., leaf 161) may be attempting to establish a BGP session to external EVPN gateway 178. These attempts repeatedly fail because packets are getting dropped in the path from external EVPN gateway 176, e.g. by a firewall or a faulty device.

Symptoms for identifying a root cause fault for a broken inbound path from external EVPN gateway 173 may include a BGP session state bounces between the connect state, the active state, and the idle state, but not other states. In some examples, symptoms for identifying a root cause fault for a broken inbound path from external EVPN gateway 173 may include TCP sockets being stuck in a state "SYN-SENT"—source IP=local EVPN speaker's loopback IP, destination port=179, destination IP=external gateway's loopback IP (source port is "don't care").

Figure 7:
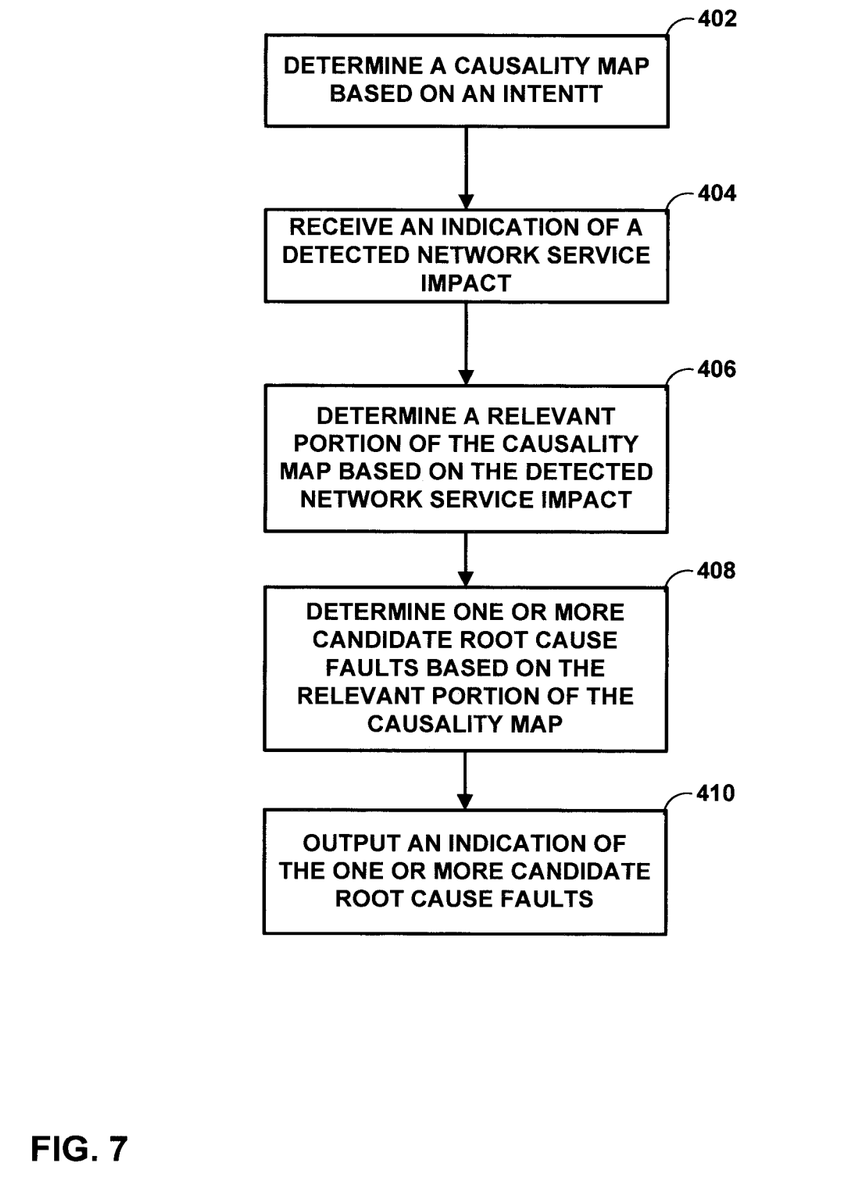
FIG. 7 is a flowchart illustrating an example process for root cause fault identification according to techniques of this disclosure.

FIG. 7 is a flowchart illustrating an example process for root cause fault identification analysis according to techniques of this disclosure. FIG. 7 is discussed with FIGS. 1-4, 5A, 5B, and 6 for example purposes only. Controller device 10 may determine a causality map based on an intent (402). The causality map may include a first plurality of nodes that each represent a respective root cause fault, a second plurality of nodes that each represent a respective symptom, and a third plurality of nodes that each represent a respective network service impact. For example, controller device 10 may determine causality map 100 of FIG. 5A that includes at least root cause faults 166, 165, symptoms 167A-167C, and impact 168E.

Controller device 10 may receive an indication of a network service impact (404). For example, controller device 10 may receive the indication of impact 168E from a customer. For instance, controller device 10 may receive a support ticket for a customer using web services associated with first virtual network label 181 ("Web services") and a first range of network addresses 171 (e.g., 10.0.1.0/24).

Controller device 10 may determine a relevant portion of causality map 100 based on the network service impact 168E (406). For example, controller device 10 may determine symptoms of network 2 and match the symptoms and network service impact to a portion of causality map 100. Controller device 10, another device, or a cloud-based system, may apply machine learning to determine causality relationships 169 that maps symptom 167A to impacts 168E, 168F, and root cause faults 166, 165.

Controller device 10 may determine one or more candidate root cause faults based on the relevant portion of causality map 100 (408). For example, controller device 10 may match impact 168E to symptoms 167A-167C and root cause faults 165, 166 as shown in FIG. 5A. In this example, controller device 10 may determine that root cause faults 165, 166 are the one or more candidate root cause faults in response to matching impact 168E to symptoms 167A-167C and root cause faults 165, 166. Controller device 10 may output an indication of the one or more candidate root cause faults (410). For example, controller device 10 may output an alert to administrator 12. In some examples, controller device 10 may suppress a set of alerts using one or more candidate root cause faults.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A method for managing a plurality of network devices of a network, the method comprising:
    determining, by one or more processors, a causality map for the plurality of network devices according to an intent, wherein the causality map comprises a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices, and wherein each node of the third plurality of nodes comprises one or more first edges to one or more nodes in the second plurality of nodes, and each node of the second plurality of nodes comprises one or more second edges to one or more nodes of the first plurality of nodes;
    receiving, by the one or more processors, an indication of a network service impact;
    determining, by the one or more processors and based on the network service impact, a relevant portion of the causality map that is less than the entire causality map;
    determining, by the one or more processors and based on the relevant portion of the causality map, one or more candidate root cause faults from a plurality of root cause faults represented by the first plurality of nodes, wherein the plurality of root cause faults comprises at least one root cause fault not included in the one or more candidate root cause faults; and
    outputting, by the one or more processors, an indication of the one or more candidate root cause faults.

2. The method of claim 1, further comprising:
    determining, by the one or more processors, a mapping of a serial number for a networking device of the plurality of network devices to a unique model identifier for the causality graph; and
    wherein determining the causality map is further based on the mapping of the serial number to the unique model identifier.

3. The method of claim 1,
    wherein determining the relevant portion of the causality map comprises matching the network service impact to one of the nodes in the third set of nodes and identifying at least one node in the first set of nodes using the one or more first edges and the one or more second edges.

4. The method of claim 1, further comprising suppressing, by the one or more processors, a set of alerts using the one or more candidate root cause faults.

5. The method of claim 1, wherein determining the one or more candidate root cause faults comprises determining that the one or more candidate root cause faults are within the relevant portion of the causality map.

6. The method of claim 1, wherein outputting the indication of the one or more candidate root cause faults comprises outputting an alert to a network administrator.

7. The method of claim 1, wherein receiving the indication of the network service impact comprises receiving a support ticket for a customer.

8. The method of claim 1, wherein the plurality of network devices are arranged in a topology comprising one or more of a 3-stage Clos network topology, a 5-stage Clos network topology, or a spine and leaf topology; and
    wherein determining the causality map is based on the topology, a role assigned to each network device of the plurality of devices, and the intent.

9. The method of claim 1, further comprising receiving, by the one or more processors, the intent as a data structure that include a plurality of vertices and a plurality of edges, each vertex of the plurality of vertices representing a respective network device of the plurality of network devices or a respective stateless intent of a plurality of stateless intents, and the plurality of edges defining relationships between the plurality of vertices.

10. The method of claim 9, wherein the data structure comprises a graph model.

11. The method of claim 9,
    wherein the first plurality of nodes comprises a first node corresponding to a Border Gateway Protocol (BGP) session for an external router being misconfigured;
    wherein the second plurality of nodes comprises a second set of nodes corresponding to one or more of BGP session operational status of the external router being down or the external router missing a non-default route to an external Ethernet Virtual Private Network (EVPN) gateway; and
    wherein the third plurality of nodes comprises a third set of nodes corresponding to one or more of missing routes in an EVPN flood list routes for the external router, missing routes in EVPN prefix routes for the external router, switched traffic for the external router being disrupted, or routed traffic for the external router being disrupted.

12. The method of claim 1,
    wherein the first plurality of nodes comprises a first node corresponding to a border leaf Border Gateway Protocol (BGP) routing policy being misconfigured;
    wherein the second plurality of nodes comprises a second set of nodes corresponding to a border leaf BGP of a leaf running a configuration that prevents learning of a non-default state; and
    wherein the third plurality of nodes comprises a third set of nodes corresponding to one or more of a BGP session operational status of the leaf being down, missing non-default routes, missing routes in an Ethernet Virtual Private Network (EVPN) flood list routes for the external router, missing routes in EVPN prefix routes for the external router, switched traffic for the external router being disrupted, or routed traffic for the external router being disrupted.

13. The method of claim 1,
    wherein the first plurality of nodes comprises a first node corresponding to a broken path to external Ethernet Virtual Private Network (EVPN) gateway for a Border Gateway Protocol (BGP) session;

wherein the second plurality of nodes comprises a second set of nodes corresponding to one or more of a BGP session state for the BGP peer session changing only between a connect state, an active state, and an idle state, or a Transmission Control Protocol (TCP) socked state for peer devices of the BGP session corresponding to waiting for an acknowledgement to a connection request; and wherein the third plurality of nodes comprises a third set of nodes corresponding to one or more of missing routes in an EVPN flood list routes for an external router, missing routes in EVPN prefix routes for the external router, switched traffic for the external router being disrupted, or routed traffic for the external router being disrupted.

14. A system comprising:

memory;

one or more processors having access to the memory; and wherein the memory stores instructions that, when executed, cause the one or more processors to:
  determine, a causality map for the plurality of network devices according to an intent, wherein the causality map comprises a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices and wherein each node of the third plurality of nodes comprises one or more first edges to one or more nodes in the second plurality of nodes, and each node of the second plurality of nodes comprises one or more second edges to one or more nodes of the first plurality of nodes;
  receive an indication of a network service impact;
  determine, based on the network service impact, a relevant portion of the causality map that is less than the entire causality map;
  determine, based on the relevant portion of the causality map, one or more candidate root cause faults from a plurality of root cause faults represented by the first plurality of nodes, wherein the plurality of root cause faults comprises at least one root cause fault not included in the one or more candidate root cause faults; and
  output an indication of the one or more candidate root cause faults.

15. Non-transitory computer-readable storage media having stored thereon instructions that, when executed, cause one or more processors of a system that manages a plurality of network devices to:
  determine, a causality map for the plurality of network devices according to an intent, wherein the causality map comprises a first plurality of nodes that each represent a respective root cause fault associated with the plurality of network devices, a second plurality of nodes that each represent a respective symptom provided, at least in part, by the plurality of network devices, and a third plurality of nodes that each represent a respective network service impact associated with the plurality of network devices and wherein each node of the third plurality of nodes comprises one or more first edges to one or more nodes in the second plurality of nodes, and each node of the second plurality of nodes comprises one or more second edges to one or more nodes of the first plurality of nodes;
  receive an indication of a network service impact;
  determine, based on the network service impact, a relevant portion of the causality map that is less than the entire causality map;
  determine, based on the relevant portion of the causality map, one or more candidate root cause faults from a plurality of root cause faults represented by the first plurality of nodes, wherein the plurality of root cause faults comprises at least one root cause fault not included in the one or more candidate root cause faults; and
  output an indication of the one or more candidate root cause faults.

16. The method of claim 1, further comprising receiving the intent from a network administrator.

17. The system of claim 14, wherein the one or more processors are further configured to:
  determine a mapping of a serial number for a networking device of the plurality of network devices to a unique model identifier for the causality graph; and
  wherein the one or more processors are configured to determine the causality map further based on the mapping of the serial number to the unique model identifier.

18. The system of claim 14, wherein, to determine the relevant portion of the causality map, the one or more processors are configured to pattern match to a model of causality relationships for the causality map.

19. The system of claim 18,
  wherein, to determine the relevant portion of the causality map, the one or more processors are configured to apply a machine learning module to the causality map to determine the causality relationships; and
  wherein the machine learning module has been trained using the causality map and using symptoms and impacts for different of root cause faults.

20. The system of claim 14, wherein, to determine the one or more candidate root cause faults, the one or more processors are configured to determine that the one or more candidate root cause faults are within the relevant portion of the causality map.

* * * * *